May 11, 1954
G. S. GOODMAN
2,678,219
CHILD'S FOLDING WALKER-STROLLER
Filed Dec. 17, 1951
2 Sheets-Sheet 2
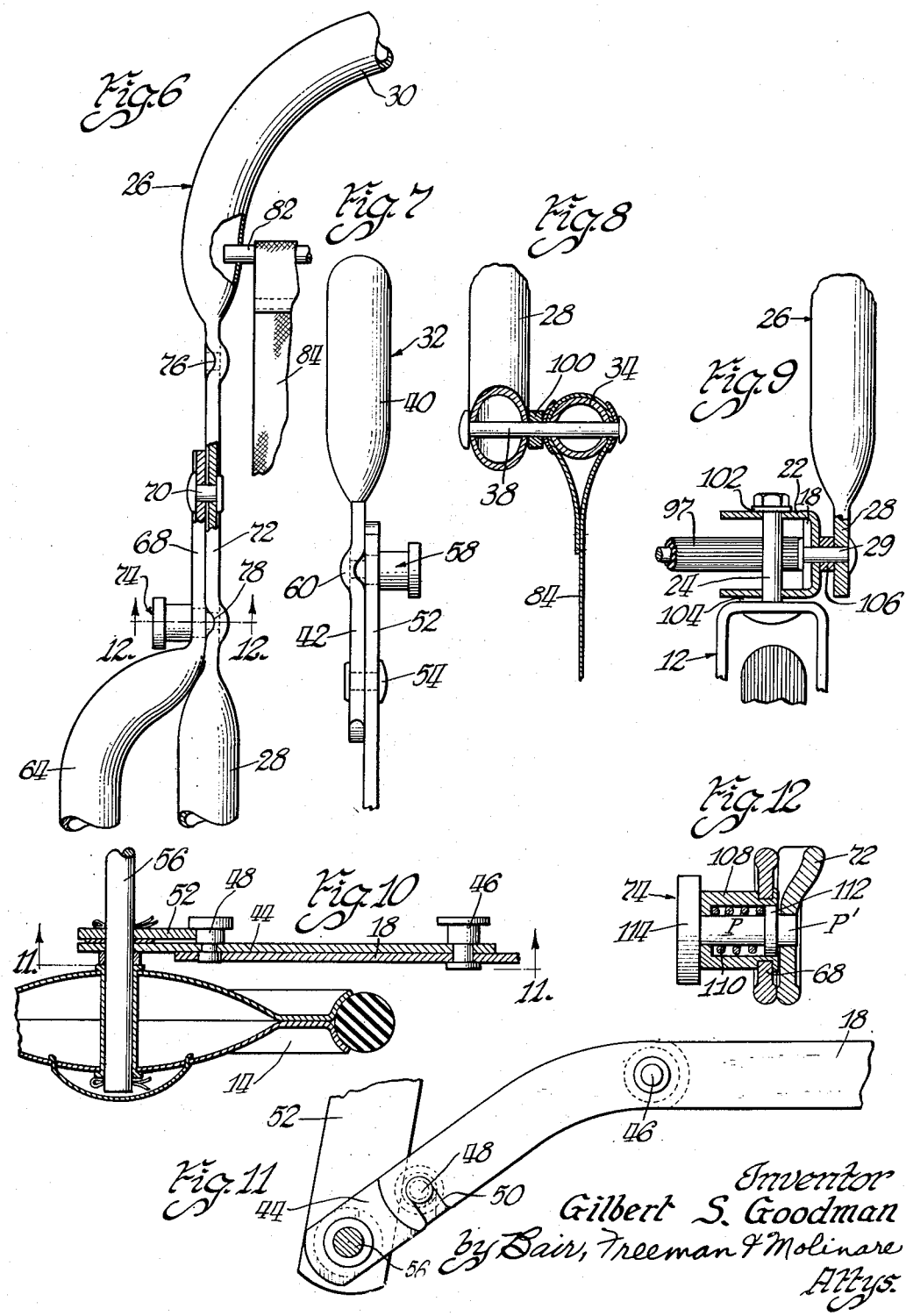
Inventor
Gilbert S. Goodman
by Bair, Freeman & Molinare
Attys.

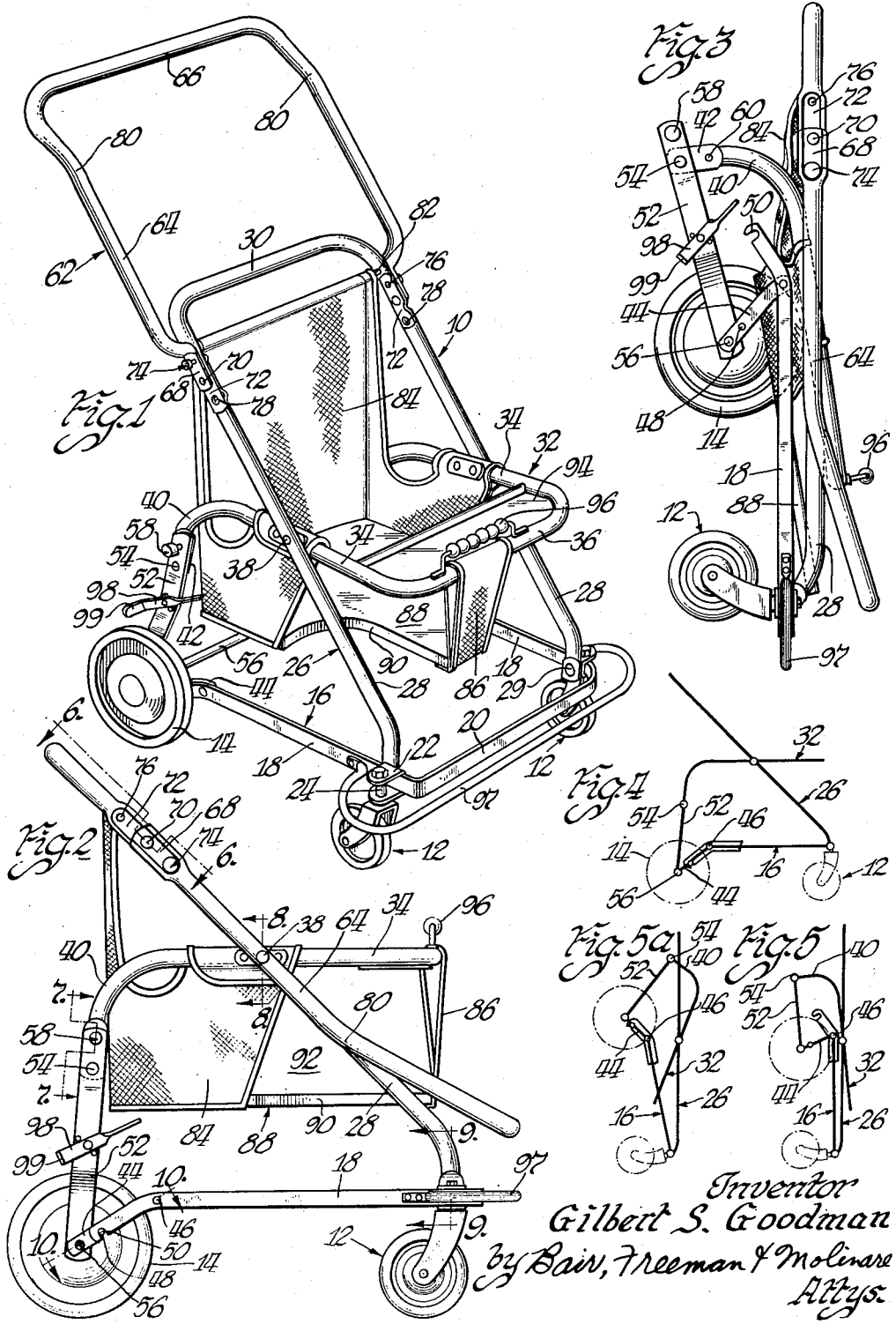

Patented May 11, 1954

2,678,219

UNITED STATES PATENT OFFICE 2,678,219

CHILD'S FOLDING WALKER-STROLLER

Gilbert S. Goodman, Winnetka, Ill., assignor to Storkline Furniture Corporation, Chicago, Ill., a corporation of Illinois Application December 17, 1951, Serial No. 261,938

12 Claims. (Cl. 280—41)

This invention relates to a vehicle for children and more particularly to a vehicle which is adapted to function as either a walker or a stroller and which is collapsible for purposes of storage.

One of the objects of this invention is to provide a collapsible child's vehicle wherein the major structural members thereof are foldable to substantially parallel positions, whereby the collapsed vehicle provides a neat and compactly folded arrangement.

Another object of this invention is to provide a collapsible vehicle wherein some of the major structural members thereof are foldable into the same plane in overlapping relationship so as to provide a neat and compactly folded arrangement.

A further object of this invention is to provide a collapsible child's vehicle wherein the major structural members thereof are formed from strips and tubes, whereby the vehicle is characterized by its simplicity and inexpensiveness of construction.

Still another object of this invention is to provide a collapsible child's vehicle having a supporting structure which can be likened basically to a triangle wherein two of the legs of the triangle are adapted to be "broken," or folded intermediate their ends, to bring about compact folding of the vehicle.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

Figure 1 is an isometric view of my walker-stroller for children with all parts unfolded;

Figure 2 is a side elevation view of my walker-stroller showing the handle extension in folded position, and also having one rear wheel removed to illustrate the details at the rear wheel axle;

Figure 3 is a side elevation view showing the walker-stroller in fully folded or collapsed condition;

Figure 4 is a diagrammatic line drawing of the framework of my walker-stroller in the unfolded condition shown in Figure 1;

Figure 5 is a diagrammatic line drawing similar to Figure 4, but with the walker-stroller in fully folded condition shown in Figure 3;

Figure 5a is a diagrammatic line drawing similar to Figures 4 and 5 showing the walker-stroller in a partially folded condition, or in a condition intermediate between those shown in Figures 4 and 5;

Figure 6 is an enlarged detail view, partly in cross section, and is taken on line 6—6 of Figure 2;

Figure 7 is an enlarged detail view and is taken on line 7—7 of Figure 2;

Figure 8 is an enlarged detail view, partly in cross section, taken on line 8—8 of Figure 2;

Figure 9 is an enlarged view taken substantially on line 9—9 of Figure 2;

Figure 10 is an enlarged cross section view taken on line 10—10 of Figure 2;

Figure 11 is a view, partly in cross section, taken on line 11—11 of Figure 10; and Figure 12 is a cross section view taken on line 12—12 of Figure 6.

Referring now to the drawings, there is shown in Figure 1 a walker-stroller vehicle generally indicated by the numeral 10. This vehicle 10 is supported on front casters generally indicated by numeral 12 and rear wheels 14. The vehicle includes a U-shaped base member 16 formed of flat strip metal, having legs 18 extending rearwardly from the connecting or bight portion 20. The casters 12 are connected to legs 18 by means of a bracket 22 adapted to have journaled therein the stem 24 of caster 12.

The vehicle 10 also includes a second U-shaped member 26 extending generally upwardly and rearwardly from the lower front end of the vehicle, and having legs 28 extending from the connecting or bight portion 30. The second U-shaped member is generally tubular except that certain portions thereof are flattened for the purpose of connection to other members. The extended ends of legs 28 are flattened and are pivotally connected by rivets or pins 29 to the legs 18 of the U-shaped base member 16. The legs 28 of the second U-shaped member are connected to base member 16 adjacent the bight 20, and also adjacent the front supports or casters 12.

The vehicle 10 also includes a U-shaped load support member generally indicated at 32 having legs 34 and a connecting or bight portion 36. The legs 34 of this load supporting member 32 are pivotally connected by rivets or pins 38 to the legs 28 of the second U-shaped member 26 at points intermediate the ends of both legs 34 and legs 28. The legs 34 extend rearwardly from the bight 36, and the extended ends of legs 34 have downwardly depending portions 40 which are flattened at their ends as at 42.

A first pair of links 44 of flat strip material, and which are more clearly seen in Figures 2, 3 and 11, are pivotally connected by means of pins or rivets 46 at points forwardly of the rearwardly extending ends of legs 18 of the U-shaped base member 16. Studs or rivets 48 are secured to links 44 intermediate the ends thereof and are adapted to enter recesses 50 formed adjacent the extended ends of legs 18. The recesses 50 and studs 48 cooperate to restrict the pivoting of links 44 about pivot pins 46.

A second pair of links 52 of flat strip material are pivotally connected adjacent one end thereof by means of rivets or pins 54 to the flattened ends 42 of the downwardly depending portions 40 of the load support member 32. The extended ends of both pairs of links 44 and 52 are journaled on an axle 56 which extends between the rear wheels 14.

The second pair of links 52 also carry spring biased pins or latches 58 which are adapted to be inserted in or cooperate with holes or recesses 60 in the flattened ends 42 of legs 34 to rigidly lock links 52 in position with respect to legs 34. The rigid locking of links 52 with respect to legs 34 also rigidly fixes axle 48 with respect to legs 34 and this further causes links 44 to be rigidly fixed with respect to the remainder of the structure.

The vehicle 10 is also provided with a handle extension 62 having legs 64 and a connecting or bight portion 66 which is adapted to serve as a hand-grasp bar in the position shown in Figure 1. The extended ends of legs 64 are inwardly bent and have flattened ends 68 which are pivotally connected by rivets or pins 70 to flattened portions 72 of legs 28. Spring biased pins or latches 74 are carried by the flattened ends 68 of legs 64 and are adapted to cooperate with holes or recesses 76 and 78 in flattened portions 72 of legs 28 to lock the handle extension 62 in either extended or folded position. The legs 64 are bent at 80 as best shown in Figure 2, so that the connecting or bight portion 66 is more conveniently located in both the folded and unfolded positions of extension handle 62.

Referring now to the seat supported by the vehicle, a cross rod or back-rest support member 82 is secured between the legs 28 of U-shaped member 26 at a region adjacent the cross or connecting member 30. A fabric member 84, in part defining a back-rest, is supported as shown from cross rod 82 and also from legs 34 of the U-shaped load supporting member 32. A second fabric member 86 is supported from the bight 36 of load supporting member 32. A wooden seat 88 is secured to the lower edges of fabric members 84 and 86 and provides a rigid seat for a child. The wooden seat 88 is recessed as at 90 and these recesses 90, together with the spacing between fabrics 84 and 86, provide spaces 92 for the legs of the child.

Also included in the chair portion of the vehicle is a flat plate 94 positioned in the forward end of U-shaped member 32 and extends between the legs 34 up to the cross member 36. A passage (not shown) is provided between plate 94 and cross member 36 to permit the attachment of fabric 86 to bight 36. This flat plate 94 provides a shelf which is desirable in this type of vehicle. For purposes of ornamentation a colored ball ornament 96 is secured to cross member 36.

A bumper 97 is provided for the vehicle and includes a bent rod covered with rubber and secured at its ends to legs 18 of lower frame member 16. A brake member 98 is formed of strip material and is pivotally mounted on one of the links 52. The brake member 98 includes a wheel engaging portion 99 adapted to be clamped against the outer resilient edge of one of the rear wheels 14 in a well known manner.

The detail in Figure 8 shows the use of a spacer or washer 100 to provide for pivoting between the legs 28 and legs 34. The detail in Figure 9 shows the use of washers 102 and 104 for anti-friction purposes in the mounting of caster 12 in brackets 22. As shown in Figure 9, the single pin 29 serves as a pivot pin for the legs 28 and the legs 18, and also serves to connect the brackets 22 to these legs. An anti-friction spacer or washer 106 is provided between legs 28 and brackets 22.

The detail in Figure 12 is that of the spring biased pins or latches 58 and 74. These spring biased latches include a pin P, a cup 108, a spring 110 positioned within the cup and concentric with pin P, and a shoulder 112 on the pin P. The spring 110 is positioned between the shoulder 112 and the base of the cup 108. The pin P is provided with a head 114 for the purpose of grasping to withdraw the tip P' of pin P and release the members secured thereby.

In the folding of the vehicle from the position shown in Figure 4 to the position shown in Figure 5, the latches 74 are pulled outwardly and this permits pivoting of the extension handle 62 to the folded position shown in Figure 2. Then the latches 58 are pulled outwardly and the links 52 are pivoted on pins 54 so that when the pins 58 are released, they will not again lock the links 52 with legs 34. Then by grasping the axle 56 and pushing it toward the legs 28, the collapsing of the vehicle is brought about through the various stages as shown from Figure 4 to Figure 5a and finally to Figure 5.

In the folding process, "breaking" first occurs between the links 52 and legs 34 and continues until the links 52 engage studs 48 on links 44. These studs 48 extend through links 44 and are thus adapted to be engaged on one side by links 52 and on the other side to enter into recesses 50 in legs 18. After link 52 has engaged stud 48, there is "breaking" between the link 44 and the leg 18 and this causes the final collapsing of the cart.

In the folded position, the legs 64 of the handle extension are positioned exteriorly of legs 28. In the fully folded position shown in Figure 3, these legs 64 are adapted to engage the edges of rear wheels 14 and prevent further movement of the axle 48 toward the legs 28. This latter feature maintains the major structural members, namely legs 18, legs 28, legs 34 and links 52, substantially parallel to each other in the folded condition so as to provide a neat and compactly folded arrangement.

In unfolding the vehicle, the rear axle 56 is pulled away from the legs 28, and this causes links 44 to pivot around pin 46 until the studs 48 seat in recesses 50 of legs 18. Further pulling away of axle 56 from legs 28 causes the links 52 to pivot around pins 54 until the spring biased latches 58 enter recesses 60 to cause locking of the structure in the unfolded condition.

Referring to the diagrammatic line drawings, Figures 4, 5 and 5a, of the framework of the vehicle, it will be seen that the framework can be likened basically to a triangle. Vertex A of the triangle is at the pivotal connection between the second U-shaped member 26 and the U-shaped base member 16. Vertex B of the triangle is located at the pivotal connection between the second U-shaped member 26 and the U-shaped load support member 32. Vertex C of the triangle is located at the axis of the rear wheel axle, which is also the pivot point between links 44 and 52.

The leg between vertices A and B is of fixed length, but the other two legs of the triangle are adapted to be "broken," or folded intermediate their ends, to bring about compact folding of the vehicle. The point of "break" of leg BC of the triangle is located at the pivot pin 54. The point of "break" of leg AC of the triangle is located at pivot pin 46. Both pivot pin 46 and pivot pin 54 are displaced from the geometrical straight lines between the vertices AC and BC. This arrangement permits "breaking" or folding of the legs AC and BC from the position shown in Figure 4 to the position shown in Figure 5. The folding of the vehicle can also be described as moving the vertex C toward the unfolded leg AB of the triangle.

A foot rest (not shown) is adapted to be removably attached to the vehicle. The foot rest is attached when the vehicle is used as a stroller and is removed when the vehicle is used as a walker.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A folding vehicle for a child comprising front wheels, rear wheels, an axle for said rear wheels, a U-shaped base member having legs extending rearwardly from the bight thereof, said front wheels being attached to said base member, a second U-shaped member having legs pivotally connected to the legs of said U-shaped base member adjacent the bight thereof, said second U-shaped member extending generally upwardly and rearwardly, the bight of said second U-shaped member adapted to serve as a hand rail, a U-shaped load support member having legs extending rearwardly from its bight, the legs of said U-shaped load support member being pivotally connected to the legs of said second U-shaped member at points intermediate the length of both sets of legs, a first pair of links pivoted on said rear wheel axle and pivotally connected to the legs of said U-shaped base member, a second pair of links pivoted on said axle and pivotally connected to the legs of said U-shaped load support member, and a seat member supported by said U-shaped load support member.

2. A folding vehicle for a child comprising front wheels, rear wheels, an axle for said rear wheels, a U-shaped base member having legs extending rearwardly from the bight thereof, said front wheels being attached to said base member, a second U-shaped member having legs pivotally connected to the legs of said U-shaped base member adjacent the bight thereof, said second U-shaped member extending generally upwardly and rearwardly, the bight of said second U-shaped member adapted to serve as a hand rail, a U-shaped load support member having legs extending rearwardly from its bight, the legs of said U-shaped load support member being pivotally connected to the legs of said second U-shaped member at points intermediate the length of both sets of legs, a first pair of links pivoted on said rear wheel axle and pivotally connected to the legs of said U-shaped base member, a second pair of links pivoted on said axle and pivotally connected to the legs of said U-shaped load support member, a seat member supported by said U-shaped load support member, studs on said first pair of links between the axle and the pivotal connection to said U-shaped base member, and recesses formed in the legs of said U-shaped base member adapted to receive said studs to limit the maximum spacing between the front and rear wheels.

3. A folding vehicle for a child comprising front wheels, rear wheels, an axle for said rear wheels, a U-shaped base member having legs extending rearwardly from the bight thereof, said front wheels being attached to said base member, a second U-shaped member having legs pivotally connected to the legs of said U-shaped base member adjacent the bight thereof, said second U-shaped member extending generally upwardly and rearwardly, the bight of said second U-shaped member adapted to serve as a hand rail, a U-shaped load support member having legs extending rearwardly from its bight, the legs of said U-shaped load support member being pivotally connected to the legs of said second U-shaped member at points intermediate the length of both sets of legs, a first pair of links pivoted on said rear wheel axle and pivotally connected to the legs of said U-shaped base member, a second pair of links pivoted on said axle and pivotally connected to the legs of said U-shaped load support member, a seat member supported by said U-shaped load support member, studs on said first pair of links between the axle and the pivotal connection to said U-shaped base member, hooks formed on the legs of said U-shaped base member having recesses therein adapted to receive said studs to limit the maximum spacing between the front and rear wheels, and means for locking said second pair of links to the legs of said U-shaped load support member, to limit the spacing between the rear wheel axle and the pivotal connection of the U-shaped load support to said second U-shaped member.

4. A folding vehicle for a child comprising front wheels, rear wheels, an axle for said rear wheels, a U-shaped base member having legs extending rearwardly from the bight thereof, said front wheels being attached to said base member, a second U-shaped member having legs pivotally connected to the legs of said U-shaped base member adjacent the bight thereof, said second U-shaped member extending generally upwardly and rearwardly, the bight of said second U-shaped member adapted to serve as a hand rail, a U-shaped load support member having legs extending rearwardly from its bight, the legs of said U-shaped load support member being pivotally connected to the legs of said second U-shaped member at points intermediate the length of both sets of legs, a first pair of links pivoted on said rear wheel axle and pivotally connected to the legs of said U-shaped base member, a second pair of links pivoted on said axle and pivotally connected to the legs of said U-shaped load support member, a seat member supported by said U-shaped load support member, means for limiting the pivoting of the first pair of links with respect to the legs of the U-shaped base member, and means for limiting the pivoting of the second pair of links with respect to the legs of the U-shaped load support member, whereby the position of the rear wheel axle may be fixed with respect to the pivotal connection between the U-shaped base member and the second U-shaped member and the pivotal connection between the second U-shaped member and the U-shaped load support member.

5. A folding vehicle for a child comprising front wheels, rear wheels, an axle for said rear wheels, a U-shaped base member having legs extending rearwardly from the bight thereof, said front wheels being attached to said base member, a second U-shaped member having legs pivotally connected to the legs of said U-shaped base member adjacent the bight thereof, said second U-shaped member extending generally upwardly and rearwardly, the bight of said second U-shaped member adapted to serve as a hand rail, a U-shaped load support member having legs extending rearwardly from its bight, the legs of said U-shaped load support member being pivotally connected to the legs of said second U-shaped member at points intermediate the length of both sets of legs, a first pair of links pivoted on said rear wheel axle and pivotally connected, at points spaced from the rear wheel axle, to the legs of said U-shaped base member, means connecting the ends of the legs of said U-shaped load support member with said axle, and a seat supported by said U-shaped load support member.

6. A folding vehicle for a child comprising front wheels, rear wheels, an axle for said rear wheels, a U-shaped base member having legs extending rearwardly from the bight thereof, said front wheels being attached to said base member, a pair of support legs pivotally connected to the legs of said U-shaped base member adjacent the bight thereof and extending generally upwardly and rearwardly, a U-shaped load support member having legs extending rearwardly from its bight, the legs of said U-shaped load support member being pivotally connected to said pair of support legs at points intermediate the length of both sets of legs, a pair of links connected to said rear wheel axle and pivotally connected, at points spaced from the rear wheel axle, to the legs of said U-shaped base member, means connecting the ends of the legs of said U-shaped load support member with said axle, and a seat supported by said U-shaped load support member.

7. A folding vehicle for a child comprising front wheels, rear wheels, an axle for said rear wheels, a U-shaped base member having legs extending rearwardly from the bight thereof, said front wheels being attached to said base member, a pair of support legs pivotally connected to the legs of said U-shaped base member adjacent the bight thereof and extending generally upwardly and rearwardly, a U-shaped load support member having legs extending rearwardly from its bight, the legs of said U-shaped load support member being pivotally connected to said pair of support legs at points intermediate the length of both sets of legs, a pair of links pivoted on said rear wheel axle and pivotally connected, at points spaced from said rear wheel axle, to the legs of said U-shaped base member, means connecting the ends of the legs of said U-shaped load support member, with said axle, a seat supported by said U-shaped load support member, means for limiting the pivoting of said links with respect to the legs of the U-shaped base member, whereby the position of the rear wheel axle may be fixed with respect to the pivotal connection between the U-shaped base member and the pair of support legs and the pivotal connection.

8. A folding vehicle for a child comprising front wheels, rear wheels, an axle for said rear wheels, a U-shaped base member having legs extending rearwardly from the bight thereof, said front wheels being attached to said base member, a second U-shaped member having legs pivotally connected to the legs of said U-shaped base member adjacent the bight thereof, said second U-shaped member extending generally upwardly and rearwardly, the bight of said second U-shaped member adapted to serve as a hand rail, a U-shaped load support member having legs extending rearwardly from its bight, the legs of said U-shaped load support member being pivotally connected to the legs of said second U-shaped member at points intermediate the length of both sets of legs, a first pair of links pivoted on said rear wheel axle and pivotally connected to the legs of said U-shaped base member, a second pair of links pivoted on said axle and pivotally connected to the legs of said U-shaped load support member, and a seat member supported by said U-shaped load support member and said second U-shaped member, a U-shaped extension handle pivotally secured by its legs to the legs of the second U-shaped member, and means for locking said U-shaped extension handle in either an extended or a folded position wherein the legs of said extension handle are substantially parallel to the legs of the second U-shaped member.

9. A folding vehicle for a child comprising front wheels, rear wheels, an axle for said rear wheels, a U-shaped base member having legs extending rearwardly from the bight thereof, said front wheels being attached to said base member, a second U-shaped member having legs pivotally connected to the legs of said U-shaped base member adjacent the bight thereof, said second U-shaped member extending generally upwardly and rearwardly, the bight of said second U-shaped member adapted to serve as a hand rail, a U-shaped load support member having legs extending rearwardly from its bight, the legs of said U-shaped load support member being pivotally connected to the legs of said second U-shaped member at points intermediate the length of both sets of legs, a first pair of links pivoted on said rear wheel axle and pivotally connected to the legs of said U-shaped base member, a second pair of links pivoted on said axle and pivotally connected to the legs of said U-shaped load support member, a seat member supported by said U-shaped load support member and said second U-shaped member, said rear wheel axle being adapted for swinging toward the second U-shaped member when the vehicle is being folded, a U-shaped extension handle pivotally secured by its legs to the legs of the second U-shaped member, and means for locking said U-shaped extension handle in either an extended or a folded position wherein the legs of said extension handle are substantially parallel to the legs of the second U-shaped member, and the legs of the extension handle, when in the folded position, being positioned exteriorly of the legs of the second U-shaped member, said legs of the extension member being adapted to engage the rear wheels of the folded vehicle to limit the movement of the rear wheel axle toward the second U-shaped member.

10. A folding vehicle for a child comprising a base member having generally defined forward and rearward ends, front supports secured to said base member adjacent the forward end thereof, an upright body member pivotally connected to said base member adjacent the front supports and extending upwardly and rearwardly therefrom, a load support member pivotally connected at a point intermediate its ends to said upright body member, first links each pivotally connected adjacent one end thereof to said base member adjacent its rearward end, second links each pivotally connected adjacent one end thereof to said load support member rearwardly of its pivotal connection to said upright body member, and the other ends of said first and second links being pivotably connected to an axle, which axle is spaced from said pivotal connection of the first links to the base member, and rear supports pivotally mounted on said axle.

11. A folding vehicle for a child comprising front wheels, rear wheels, an axle for said rear wheels, a U-shaped base member having legs extending rearwardly from the bight thereof, said front wheels being attached to said base member, a pair of support legs pivotally connected to the legs of said U-shaped base member adjacent the bight thereof and extending generally upwardly and rearwardly, a U-shaped load support member having legs extending rearwardly of its bight, the legs of said U-shaped load support member being pivotally connected to said pair of support legs at points intermediate the length of both sets of legs, a pair of links pivotally connected to the legs of said U-shaped base member and connected to said axle, means connecting the ends of the legs of said U-shaped load support member with said axle, a seat supported by said U-shaped load support member, a U-shaped extension handle secured by its legs to said pair of support legs and adapted to be moved relative to said support legs to either extended or folded positions, and means for locking said U-shaped extension handle in either said extended or folded positions, in both of which positions the legs of said U-shaped extension handle being parallel to the pair of support legs.

12. A folding vehicle for a child comprising front wheels, rear wheels, an axle for said rear wheels, a U-shaped base member having legs extending rearwardly from the bight thereof, said front wheels being attached to said base member, a second U-shaped member having legs pivotally connected to the legs of said U-shaped base member adjacent the bight thereof, said second U-shaped member extending generally upwardly and rearwardly, the bight of said second U-shaped member adapted to serve as a hand rail, a U-shaped load support member having legs extending rearwardly of its bight, the legs of said U-shaped load support member being pivotally connected to the legs of said second U-shaped member at points intermediate the length of both sets of legs, a pair of links connected with said axle and pivotally connected to the legs of said U-shaped base member at points spaced from said axle, means connecting the ends of the legs of said U-shaped load support member with said axle, a seat supported by said U-shaped load support member, and a back-rest connected to said seat and supported by a back-rest support member mounted on one of said U-shaped members.

References Cited in the file of this patent

UNITED STATES PATENTS

| Number | Name | Date |
|---|---|---|
| 2,111,974 | Kroll et al. | Mar. 22, 1938 |
| 2,141,881 | Schray | Dec. 27, 1938 |
| 2,301,640 | Peltier | Nov. 10, 1942 |
| 2,616,718 | Heideman | Nov. 4, 1952 |